(12) United States Patent
Gonion

(10) Patent No.: US 8,683,178 B2
(45) Date of Patent: Mar. 25, 2014

(54) SHARING A FAULT-STATUS REGISTER WHEN PROCESSING VECTOR INSTRUCTIONS

(75) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 502 days.

(21) Appl. No.: 13/090,961

(22) Filed: Apr. 20, 2011

(65) Prior Publication Data

US 2012/0192005 A1 Jul. 26, 2012

Related U.S. Application Data

(60) Provisional application No. 61/435,183, filed on Jan. 21, 2011.

(51) Int. Cl.
*G06F 15/00* (2006.01)
*G06F 15/76* (2006.01)

(52) U.S. Cl.
USPC ........ 712/4; 712/2; 712/3; 712/218; 712/241; 714/10; 714/15; 714/47.1; 714/13

(58) Field of Classification Search
USPC .............. 712/2–4, 241, 218; 714/15, 47.1, 13
See application file for complete search history.

(56) References Cited

U.S. PATENT DOCUMENTS

| | | | | | |
|---|---|---|---|---|---|
| 4,873,630 | A | * | 10/1989 | Rusterholz et al. | 712/3 |
| 5,568,380 | A | * | 10/1996 | Brodnax et al. | 700/79 |
| 5,790,821 | A | * | 8/1998 | Pflum | 712/200 |
| 6,081,783 | A | * | 6/2000 | Divine et al. | 704/500 |
| 6,243,804 | B1 | * | 6/2001 | Cheng | 712/228 |
| 7,395,419 | B1 | * | 7/2008 | Gonion | 712/241 |
| 7,984,273 | B2 | * | 7/2011 | Sprangle et al. | 712/225 |
| 2005/0050387 | A1 | * | 3/2005 | Mariani et al. | 714/13 |
| 2006/0004996 | A1 | * | 1/2006 | Gonion | 712/241 |
| 2006/0015703 | A1 | * | 1/2006 | Ramchandran et al. | 712/34 |
| 2008/0059758 | A1 | * | 3/2008 | Sachs | 712/4 |
| 2008/0059759 | A1 | * | 3/2008 | Sachs | 712/4 |
| 2008/0114969 | A1 | * | 5/2008 | Gonion et al. | 712/223 |
| 2008/0229076 | A1 | * | 9/2008 | Gonion | 712/214 |
| 2008/0288744 | A1 | * | 11/2008 | Gonion et al. | 711/210 |
| 2008/0288745 | A1 | * | 11/2008 | Gonion et al. | 712/4 |
| 2008/0288754 | A1 | * | 11/2008 | Gonion et al. | 712/217 |
| 2008/0288759 | A1 | * | 11/2008 | Gonion et al. | 712/235 |

* cited by examiner

*Primary Examiner* — Joshua P Lottich
*Assistant Examiner* — Jeison C Arcos
(74) *Attorney, Agent, or Firm* — Park, Vaughan, Fleming & Dowler LLP; Anthony P. Jones

(57) ABSTRACT

The described embodiments provide a processor that executes vector instructions. In the described embodiments, the processor initializes an architectural fault-status register (FSR) and a shadow copy of the architectural FSR by setting each of N bit positions in the architectural FSR and the shadow copy of the architectural FSR to a first predetermined value. The processor then executes a first first-faulting or non-faulting (FF/NF) vector instruction. While executing the first vector instruction, the processor also executes one or more subsequent FF/NF instructions. In these embodiments, when executing the first vector instruction and the subsequent vector instructions, the processor updates one or more bit positions in the shadow copy of the architectural FSR to a second predetermined value upon encountering a fault condition. However, the processor does not update bit positions in the architectural FSR upon encountering a fault condition for the first vector instruction and the subsequent vector instructions.

24 Claims, 3 Drawing Sheets

US 8,683,178 B2

SHARING A FAULT-STATUS REGISTER WHEN PROCESSING VECTOR INSTRUCTIONS

RELATED APPLICATIONS

This application is a non-provisional application from, and hereby claims priority under 35 U.S.C. §120 to, U.S. provisional patent application 61/435,183, entitled "Sharing a Fault-Status Register when Processing Vector Instructions," by inventor Jeffry E. Gonion, filed on 21 Jan. 2011.

This application is related to: (1) pending application Ser. No. 12/419,629, entitled "Method and Apparatus for Executing Program Code," by inventors Jeffry E. Gonion and Keith E. Diefendorff, filed on 7 Apr. 2009; (2) pending application Ser. No. 12/419,644, entitled "Break, Pre-Break, and Remaining Instructions for Processing Vectors," by inventors Jeffry E. Gonion and Keith E. Diefendorff, filed on 7 Apr. 2009; (3) pending application Ser. No. 12/419,661, entitled "Check-Hazard Instructions for Processing Vectors," by inventors Jeffry E. Gonion and Keith E. Diefendorff, filed on 7 Apr. 2009; (4) pending application Ser. No. 12/495,656, entitled "Copy-Propagate, Propagate-Post, and Propagate-Prior Instructions For Processing Vectors," by inventors Jeffry E. Gonion and Keith E. Diefendorff, filed on 30 Jun. 2009; (5) pending application Ser. No. 12/495,643, entitled "Shift-In-Right Instructions for Processing Vectors," by inventors Jeffry E. Gonion and Keith E. Diefendorff, filed on 30 Jun. 2009; (6) pending application Ser. No. 12/495,631, entitled "Increment-Propagate and Decrement-Propagate Instructions for Processing Vectors," by inventors Jeffry E. Gonion and Keith E. Diefendorff, filed on 30 Jun. 2009; (7) pending application Ser. No. 12/541,505, entitled "Running-Sum Instructions for Processing Vectors," by inventors Jeffry E. Gonion and Keith E. Diefendorff, filed on 14 Aug. 2009; (8) pending application Ser. No. 12/541,526, entitled "Running-AND, Running-OR, Running-XOR, and Running-Multiply Instructions for Processing Vectors" by inventors Jeffry E. Gonion and Keith E. Diefendorff, filed on 14 Aug. 2009; and (9) pending application Ser. No. 12/541,546, entitled "Running-Shift Instructions for Processing Vectors," by inventors Jeffry E. Gonion and Keith E. Diefendorff, filed 14 Aug. 2009.

This application is also related to: (1) pending application Ser. No. 12/873,043, entitled "Running-Min and Running-Max Instructions for Processing Vectors," by inventors Jeffry E. Gonion and Keith E. Diefendorff, filed 31 Aug. 2010; (2) pending application Ser. No. 12/873,063, entitled "Non-Faulting and First-Faulting Instructions for Processing Vectors," by inventors Jeffry E. Gonion and Keith E. Diefendorff, filed 31 Aug. 2010; (3) pending application Ser. No. 12/873,074, entitled "Vector Test Instruction for Processing Vectors" by inventors Jeffry E. Gonion and Keith E. Diefendorff, filed 31 Aug. 2010; (4) pending application Ser. No. 12/907,471, entitled "Select First and Select Last Instructions for Processing Vectors," by inventors Jeffry E. Gonion and Keith E. Diefendorff, filed 19 Oct. 2010; (5) pending application Ser. No. 12/907,490, entitled "Actual Instruction and Actual-Fault Instructions for Processing Vectors," by inventors Jeffry E. Gonion and Keith E. Diefendorff, filed 19 Oct. 2010; (6) pending application Ser. No. 12/977,333, entitled "Remaining Instruction for Processing Vectors," by inventors Jeffry E. Gonion and Keith E. Diefendorff, filed 23 Dec. 2010; and (7) pending application Ser. No. 13/006,243, entitled "Generate Predicts Instruction for Processing Vectors," by inventors Jeffry E. Gonion and Keith E. Diefendorff, filed 13 Jan. 2011.

This application is also related to: (1) pending application Ser. No. 12/237,212, entitled "Conditional Data-Dependency Resolution in Vector Processors," by inventors Jeffry E. Gonion and Keith E. Diefendorff, filed 24 Sep. 2008; (2) pending application Ser. No. 12/237,196, entitled "Generating Stop Indicators Based on Conditional Data Dependency in Vector Processors," by inventors Jeffry E. Gonion and Keith E. Diefendorff, filed 24 Sep. 2008; and (3) pending application Ser. No. 12/237,190, entitled "Generating Predicate Values Based on Conditional Data Dependency in Vector Processors," by inventors Jeffry E. Gonion and Keith E. Diefendorff, filed 24 Sep. 2008.

BACKGROUND

1. Field

The described embodiments relate to techniques for improving the performance of computer systems. More specifically, the described embodiments relate to sharing a fault-status register when processing vector instructions.

2. Related Art

Recent advances in processor design have led to the development of a number of different processor architectures. For example, processor designers have created superscalar processors that exploit instruction-level parallelism (ILP), multi-core processors that exploit thread-level parallelism (TLP), and vector processors that exploit data-level parallelism (DLP). Each of these processor architectures has unique advantages and disadvantages which have either encouraged or hampered the widespread adoption of the architecture. For example, because ILP processors can often operate on existing program code that has undergone only minor modifications, these processors have achieved widespread adoption. However, TLP and DLP processors typically require applications to be manually re-coded to gain the benefit of the parallelism that they offer, a process that requires extensive effort. Consequently, TLP and DLP processors have not gained widespread adoption for general-purpose applications.

One significant issue affecting the adoption of DLP processors is the vectorization of loops in program code. In a typical program, a large portion of execution time is spent in loops. Unfortunately, many of these loops have characteristics that render them unvectorizable in existing DLP processors. Thus, the performance benefits gained from attempting to vectorize program code can be limited.

One significant obstacle to vectorizing loops in program code in existing systems is dependencies between iterations of the loop. For example, loop-carried data dependencies and memory-address aliasing are two such dependencies. These dependencies can be identified by a compiler during the compiler's static analysis of program code, but they cannot be completely resolved until runtime data is available. Thus, because the compiler cannot conclusively determine that runtime dependencies will not be encountered, the compiler cannot vectorize the loop. Hence, because existing systems require that the compiler determine the extent of available parallelism during compilation, relatively little code can be vectorized.

SUMMARY

The described embodiments provide a processor that executes vector instructions. In the described embodiments, the processor initializes an architectural fault-status register (FSR) and a shadow copy of the architectural FSR by setting each of N bit positions in the architectural FSR and the shadow copy of the architectural FSR to a first predetermined value. The processor then executes a first vector instruction, wherein the first vector instruction is a first-faulting or non-faulting vector instruction. While executing the first vector instruction, the processor also executes one or more subsequent vector instructions, wherein each of the subsequent vector instructions is a first-faulting or non-faulting vector instruction. In these embodiments, when executing the first vector instruction and the subsequent vector instructions (i.e., while performing a corresponding operation for the first vector instruction or one of the subsequent vector instructions), the processor updates one or more bit positions in the shadow copy of the architectural FSR to a second predetermined value upon encountering a fault condition. In these embodiments, the processor does not update bit positions in the architectural FSR upon encountering a fault condition for the first vector instruction and the subsequent vector instructions.

In the described embodiments, when executing the first vector instruction and the subsequent vector instructions, the processor reads the shadow copy of the architectural FSR, and not the architectural FSR, to determine elements, if any, for which the first vector instruction or one of the subsequent vector instructions encountered a fault condition.

In the described embodiments, when reading the shadow copy of the architectural FSR, the processor reads the shadow copy of the architectural FSR while at least one of the first vector instruction or one of the subsequent vector instructions are still being executed, and hence may still update the shadow copy of the architectural FSR.

In the described embodiments, the processor cancels an operation for one or more elements for at least one of the first vector instruction or any of the subsequent vector instructions based on the state of one or more corresponding bit positions of the shadow copy of the architectural FSR upon an update to the shadow copy of the architectural FSR.

In the described embodiments, canceling the operation comprises canceling or not executing an operation on the one or more elements based on an update to the shadow copy of the architectural FSR that would normally occur after the operation if the shadow copy of the architectural FSR were updated in program order.

In the described embodiments, wherein upon encountering a predetermined vector instruction that synchronizes the architectural FSR with the shadow FSR, the processor stalls the execution of the vector instruction that synchronizes the architectural FSR with the shadow FSR until the first vector instruction and the subsequent vector instructions have completed all possible updates to the shadow copy of the architectural FSR, and, when the first vector instruction and the subsequent vector instructions have completed all possible updates to the shadow copy of the architectural FSR, the processor copies the value from the shadow copy of the architectural FSR to the architectural FSR. The processor then executes the predetermined vector instruction to synchronize the architectural FSR with the shadow FSR.

In the described embodiments, the processor creates a second shadow copy of the architectural FSR and initializes each of N bit positions in the second shadow copy of the architectural FSR to a first predetermined value. While subsequently executing further first-faulting or non-faulting vector instructions that update one or more bit positions of the shadow copy of the architectural FSR to a second predetermined value upon encountering a fault condition while performing a corresponding operation, the processor updates the second shadow copy of the architectural FSR.

In the described embodiments, the predetermined vector instruction is an Actual instruction.

In the described embodiments, when updating one or more corresponding elements of the shadow copy of the architectural FSR to a second predetermined value, the processor updates the elements of the shadow copy of the architectural FSR each time one of the first vector instruction or the subsequent vector instructions encounters a fault condition, regardless of the program order of the vector instruction that updates the shadow copy of the architectural FSR.

BRIEF DESCRIPTION OF THE FIGURES

In the figures, like reference numerals refer to the same figure elements.

DETAILED DESCRIPTION

Figure 1:
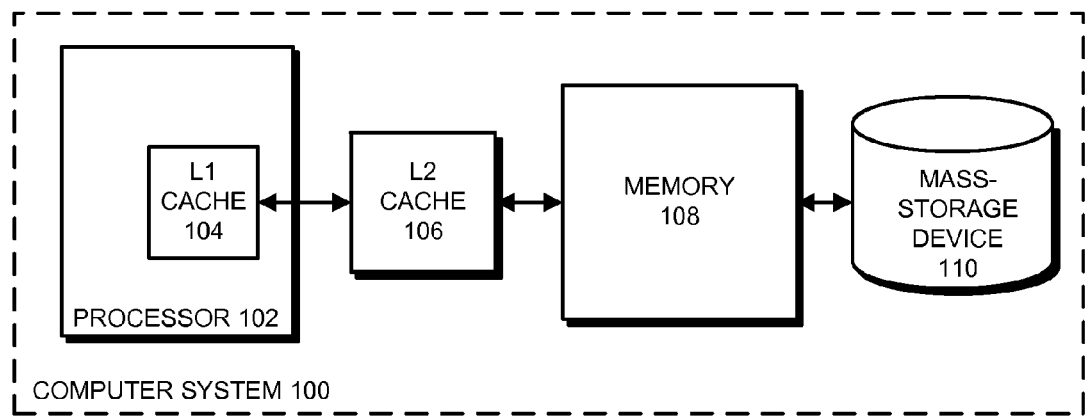
FIG. 1 presents a block diagram of a computer system in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory and non-volatile memory, such as magnetic and optical storage devices such as disk drives, magnetic tape, CDs (compact discs), DVDs (digital versatile discs or digital video discs), or other media capable of storing data structures or code.

The methods and processes described in this detailed description can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules. In some embodiments, the hardware modules include one or more general-purpose circuits that are configured by executing instructions to perform the methods and processes.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Macroscalar Architecture

The embodiments described herein are based in part on the Macroscalar Architecture that is described in U.S. patent application Ser. No. 12/977,333, entitled "Generate Predicates Instruction for Processing Vectors," by inventors Jeffry E. Gonion and Keith Diefendorff, filed on 23 Dec. 2010 (hereinafter "the '333 application"), the contents of which are incorporated by reference.

As described in the '333 application, the described embodiments provide an instruction set and supporting hardware that allow compilers to generate program code for loops without completely determining parallelism at compile-time, and without discarding useful static analysis information. Specifically, these embodiments provide a set of instructions that do not mandate parallelism for loops but instead enable parallelism to be exploited at runtime if dynamic conditions permit. These embodiments thus include instructions that enable code generated by the compiler to dynamically switch between non-parallel (scalar) and parallel (vector) execution for loop iterations depending on conditions at runtime by switching the amount of parallelism used.

These embodiments provide instructions that enable an undetermined amount of vector parallelism for loop iterations but do not require that the parallelism be used at runtime. More specifically, these embodiments include a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, the described embodiments execute the two elements in parallel. In these embodiments, expressing program code in a vector-length agnostic format enables a broad range of vectorization opportunities that are not present in existing systems.

In the described embodiments, during compilation, a compiler first analyzes the loop structure of a given loop in program code and performs static dependency analysis. The compiler then generates program code that retains static analysis information and instructs processor 102 (see FIG. 1) how to resolve runtime dependencies and process the program code with the maximum amount of parallelism possible. More specifically, the compiler provides vector instructions for performing corresponding sets of loop iterations in parallel, and provides vector-control instructions for dynamically limiting the execution of the vector instructions to prevent data dependencies between the iterations of the loop from causing an error (which can be called "vector partitioning"). This approach defers the determination of parallelism to runtime, where the information on runtime dependencies is available, thereby allowing the software and processor to adapt parallelism to dynamically changing conditions.

Terminology

Throughout the description, we use the following terminology. These terms may be generally known in the art, but are described below to clarify the subsequent descriptions.

The term "active element," as used in this description to refer to one or more elements of a vector, indicates elements that are operated on during a given operation. Generally, the described embodiments enable a vector execution unit to selectively perform parallel operations on one or more available elements in a given vector in parallel. For example, an operation can be performed on only the first two of eight elements of the vector in parallel. In this case, the first two elements are "active elements," while the remaining six elements are "inactive elements." In the described embodiments, one or more other vectors can be used to determine which elements in a given operand vector are active (i.e., are to be operated on). For example, a "predicate vector" can include "active" elements that are used to determine which elements in the operand vector to perform operations on. In some embodiments, elements that contain data of a predetermined type are active elements (e.g., true, false, non-zero, zero, uppercase/lowercase characters, even/odd/prime numbers, vowels, whole numbers, etc.).

The terms "true" and "false" are used in this description to refer to data values (e.g., a data value contained in an element in a vector). Generally, in computer systems true and false are often represented by 1 and 0, respectively. In practice, a given embodiment could use any value to represent true and false, such as the number 55, or the letter "T."

Notation

In describing the embodiments in the instant application, we use the following formats for variables, which are vector quantities unless otherwise noted:

p5=a<b;
  Elements of vector p5 are set to 0 or 1 depending on the result of the comparison operation a<b. Note that vector p5 can be a predicate vector that can be used to control the number of elements of one or more vector instructions that execute in parallel.

~p5; a=b+c;
  Only elements in vector a designated by active (i.e., non-zero) elements in the predicate vector p5 receive the result of b+c. The remaining elements of a are unchanged. This operation is called "predication," and is denoted using the tilde ("~") before the predicate vector.

!p5; a=b+c;
  Only elements in vector a designated by active (i.e., non-zero) elements in the predicate vector p5 receive the result of b+c. The remaining elements of a are set to zero. This operation is called "zeroing," and is denoted using the exclamation point ("!") before the predicate vector.

--- if (FIRST( )) goto ...; Also LAST( ), ANY( ), ALL( ), CARRY( ), ABOVE( ), or NONE( ), (where ANY( ) == !NONE( ))

---

These instructions test the processor status flags and branch accordingly.

x+=VECLEN;
  VECLEN is a value that communicates the number of elements per vector. The value is determined at runtime by the processor 102, rather than being determined by the compiler/assembler.

//Comment
  In a similar way to many common programming languages, the examples presented below use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors discussed herein are vectors of integers, but alternative embodiments support other data formats.

Instruction Definitions

The described embodiments include first-faulting and non-faulting instructions that are used for performing vector operations and handling fault conditions that may occur during the vector operations. For example, in these embodiments, vector read operations can be performed using the VectorReadFF instruction, which is a first-faulting instruction, and/or the VectorReadNF instruction, which is a non-faulting instruction. This section provides a brief description of the VectorReadFF and VectorReadNF instructions to enable a clearer understanding of the described embodiments.

As can be seen from the definition below, in some embodiments, the VectorReadFF and VectorReadNF instructions include a further specification of the data type upon which the instructions operate. For example, in some embodiments, the instruction is specified as VectorReadIntFF or VectorReadIntNF when reading integer data. However, for clarity, in this description, the VectorReadFF and VectorReadNF instructions are described generally, i.e., with no data type specified.

Although the embodiments are described using the VectorReadFF and VectorReadNF instructions, the described embodiments are not limited to these instructions. Generally, the described embodiments can include first-faulting or non-faulting variants for any vector instruction that can cause faults. For example, the described embodiments can include first-faulting or non-faulting variants of mathematical instructions (e.g., divide, modulo, etc.) or other types of instructions. In these embodiments, processor 102 can handle faults caused by the non-faulting or first-faulting variants of vector instructions in a similar way to the way that faults/exceptions are handled for the VectorReadFF and VectorReadNF instructions. A more detailed description of first-faulting and non-faulting instructions and their interactions with other instructions and/or processor 102 can be found in U.S. patent application Ser. No. 12/873,063, entitled "Non-Faulting and First-Faulting Instructions for Processing Vectors," by inventors Jeffry E. Gonion and Keith Diefendorff, filed on 31 Aug. 2010, the contents of which are incorporated by reference.

In addition, a dedicated instruction is not the only way to cause processor 102 to process instructions as first-faulting or non-faulting. In some embodiments, processor 102 can include one or more mechanisms (configuration registers, switches, variables, etc.) for configuring processor 102 to process vector instructions as first-faulting or non-faulting, regardless of the manner in which the instructions would be processed normally. For example, in some embodiments, processor 102 can be configured to operate in a soft-termination mode, which is an operating mode wherein "all-faulting" instructions (instructions that normally cause processor 102 to fault if an illegal operating condition is detected, regardless of the vector element where the illegal operating condition occurs) are handled as first-faulting instructions. As another example, in some embodiments, processor 102 can be configured to operate in an arithmetic first-faulting mode, which is an operating mode wherein arithmetic instructions (which are normally "all-faulting" instructions) are handled by processor 102 as first-faulting instructions, respectively.

Note that the format of the following instruction definitions is a statement of the instruction type followed by a description of the instruction.

VectorReadFF

This instruction reads a vector of data from a vector of addresses calculated from its inputs. Only the first active element can generate a memory fault or exception. A vector of offsets in offset are scaled by 1, 2, 4, or 8, according to type, and added to the scalar address specified in ptr. Data is returned in the destination register. When a predicate vector is received (and not, therefore, assumed), only addresses corresponding to active elements are read.

This instruction only causes a page fault if the first active address is illegal or otherwise unmapped. If a faulting condition occurs in positions subsequent to the first active element, no exception is generated and corresponding bits in the FSR are set.

The interface for this instruction is:
Vector VectorRead<type>FF(void *ptr, Vector offset);

VectorReadNF

This instruction reads a vector of data from a vector of addresses calculated from its inputs. This instruction does not generate any memory faults, and thus may not actually read memory if a fault should have occurred. A vector of offsets in offset are scaled by 1, 2, 4, or 8, according to type, and added to the scalar address specified in ptr. Data is returned in the destination register. When a predicate vector is received (and not, therefore, assumed), only addresses corresponding to active elements are read.

This instruction does not fault if an address is illegal or otherwise unmapped. If a faulting condition occurs, no exception is generated and corresponding bits in the FSR are set.

The interface for this instruction is:

Vector VectorRead<type>NF(void *ptr, Vector offset);
Flags: NONE: Set if no elements read; cleared otherwise.

Computer System

FIG. 1 presents a block diagram of a computer system 100 in accordance with the described embodiments. Computer system 100 includes processor 102, L2 cache 106, memory 108, and mass-storage device 110. Processor 102 includes L1 cache 104.

Processor 102 can be a general-purpose processor that performs computational operations. For example, processor 102 can be a central processing unit (CPU) such as a microprocessor, a controller, an application-specific integrated circuit (ASIC), or a field-programmable gate array (FPGA). In the described embodiments, processor 102 has one or more mechanisms for vector processing (i.e., vector execution units).

Mass-storage device 110, memory 108, L2 cache 106, and L1 cache 104 are computer-readable storage devices that collectively form a memory hierarchy that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments, L2 cache 106, memory 108, and mass-storage device 110 are shared between one or more processors in computer system 100. Such memory structures are well-known in the art and are therefore not described in more detail.

In some embodiments, the devices in the memory hierarchy (i.e., L1 cache 104, etc.) can access (i.e., read and/or write) multiple cache lines per cycle. These embodiments enable more effective processing of memory accesses that occur based on a vector of pointers or array indices to non-contiguous memory addresses. In addition, in some embodiments, the caches in the memory hierarchy are divided into a number of separate banks, each of which can be accessed in parallel. Banks within caches and parallel accesses of the banks are known in the art and hence are not described in more detail.

Computer system 100 can be incorporated into many different types of electronic devices. For example, computer system 100 can be part of a desktop computer, a laptop computer, a server, a media player, an appliance, a cellular phone, a piece of testing equipment, a network appliance, a personal digital assistant (PDA), a hybrid device (i.e., a "smart phone"), or another electronic device.

Although we use specific components to describe computer system 100, in alternative embodiments, different components may be present in computer system 100. For example, computer system 100 may not include some of the memory hierarchy (e.g., memory 108 and/or mass-storage device 110). Alternatively, computer system 100 may include video cards, video-capture devices, user-interface devices, network cards, optical drives, and/or other peripheral devices that are coupled to processor 102 using a bus, a network, or another suitable communication channel. Computer system 100 may also include one or more additional processors, wherein the processors share some or all of L2 cache 106, memory 108, and mass-storage device 110.

Processor

Figure 2:
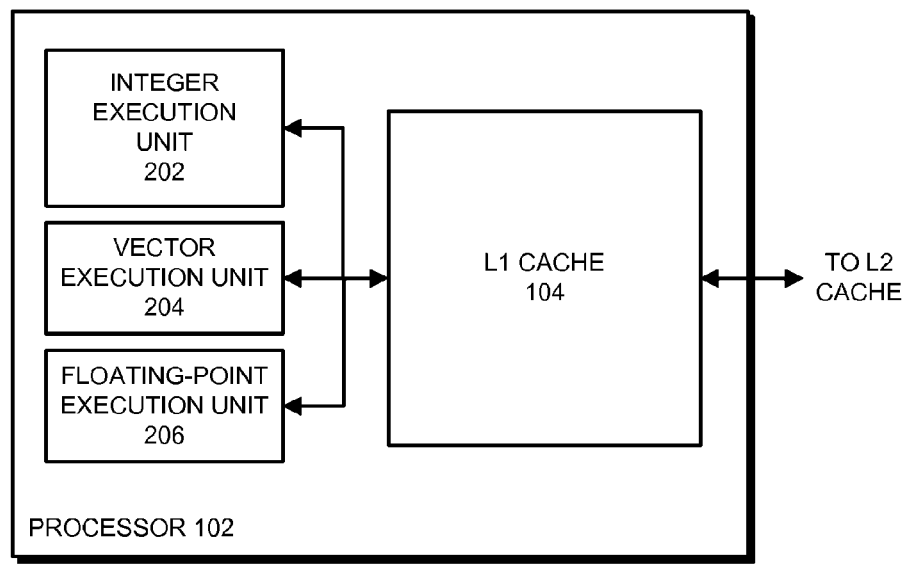
FIG. 2 presents an expanded view of a processor in accordance with the described embodiments.

FIG. 2 presents an expanded view of processor 102 in accordance with the described embodiments. As is shown in FIG. 2, processor 102 includes L1 cache 104, integer execution unit 202, floating-point execution unit 206, and vector execution unit 204 (integer execution unit 202, floating-point execution unit 206, and vector execution unit 204 as a group are interchangeably referred to as "the execution units").

Each of execution units 202-206 is used for performing computational operations, such as logical operations, mathematical operations, or bitwise operations for an associated type of operand. More specifically, integer execution unit 202 is used for performing computational operations that involve integer operands, floating-point execution unit 206 is used for performing computational operations that involve floating-point operands, and vector execution unit 204 is used for performing computational operations that involve vector operands. Integer execution units and floating-point execution units are generally known in the art and are not described in more detail.

Figure 3:
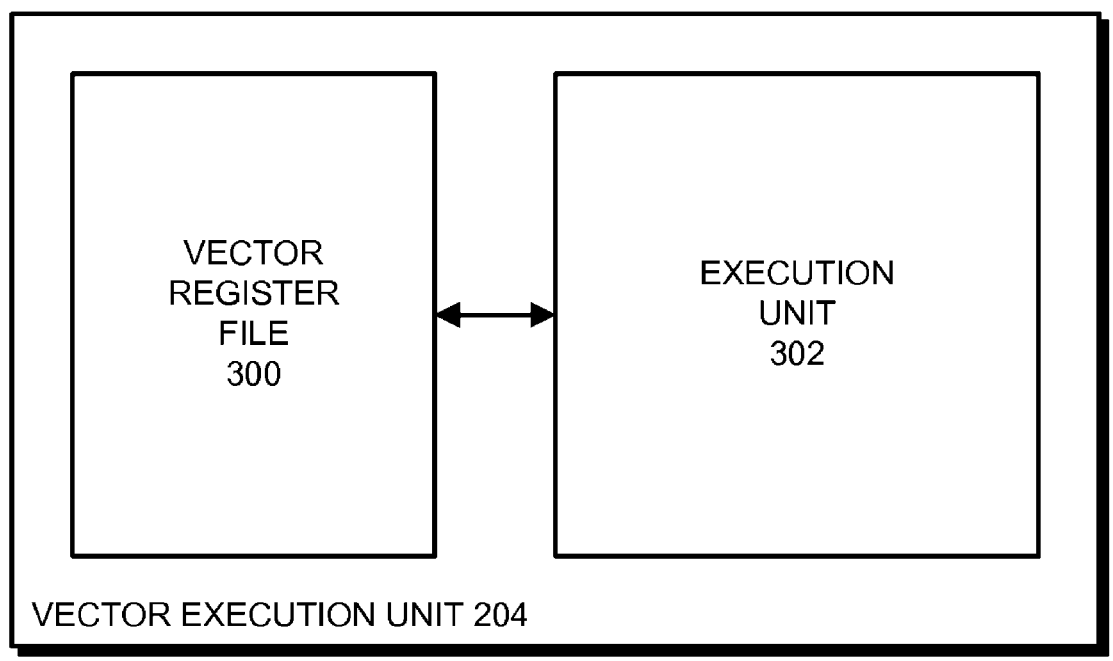
FIG. 3 presents an expanded view of a vector execution unit in accordance with the described embodiments.

In the described embodiments, vector execution unit 204 is a single-instruction-multiple-data (SIMD) execution unit that performs operations in parallel on some or all of the data elements that are included in vectors of operands. FIG. 3 presents an expanded view of vector execution unit 204 in accordance with the described embodiments. As is shown in FIG. 3, vector execution unit 204 includes a vector register file 300 and an execution unit 302. Vector register file 300 includes a set of vector registers that can hold operand vectors and result vectors for execution unit 302. In some embodiments, there are 32 vector registers in the vector register file, and each register includes 128 bits. In alternative embodiments, there are different numbers of vector registers and/or different numbers of bits per register.

Execution unit 302 retrieves operands from registers in vector register file 300 and executes vector instructions that cause execution unit 302 to perform operations in parallel on some or all of the data elements (or, simply, "elements") in the operand vector. For example, execution unit 302 can perform logical operations, mathematical operations, or bitwise operations on the elements in the vector. Execution unit 302 can perform one vector operation per cycle (although the "cycle" may include more than one cycle of a clock used to trigger, synchronize, and/or control execution unit 302's computational operations).

In the described embodiments, execution unit 302 supports vectors that hold N data elements (e.g., bytes, words, double-words, etc.). In these embodiments, execution unit 302 can perform operations on N or fewer of the data elements in an operand vector in parallel. For example, assuming an embodiment where the vector is 256 bits in length (i.e., 32 bytes), the data elements being operated on are four-byte words, and the operation is adding a value to the data elements, these embodiments can add the value to any number of the eight words in the vector.

In the described embodiments, execution unit 302 includes at least one control signal that enables the dynamic limitation of the data elements in an operand vector on which execution unit 302 operates. Specifically, depending on the state of the control signal, execution unit 302 may or may not operate on all the data elements in the vector. For example, assuming an embodiment where the vector is 512 bits in length and the data elements being operated on are four-byte words, the control signal can be asserted to prevent operations from being performed on some or all of 16 data words in the operand vector. Note that "dynamically" limiting the data elements in the operand vector upon which operations are performed can involve asserting the control signal separately for each cycle at runtime.

In some embodiments, based on the values contained in a vector of predicates or one or more scalar predicates, execution unit 302 applies vector operations to selected vector data elements only. In some embodiments, the remaining data elements in a result vector remain unaffected (which we call "predication") or are forced to zero (which we call "zeroing"). In some of these embodiments, the clocks for the data element processing subsystems ("lanes") that are unused due to predication or zeroing in execution unit 302 can be gated, thereby reducing dynamic power consumption in execution unit 302.

The described embodiments are vector-length agnostic. Thus, a compiler or programmer need not have explicit knowledge of the vector length supported by the underlying hardware (e.g., vector execution unit 302). In these embodiments, a compiler generates or a programmer writes program code that need not rely on (or use) a specific vector length (some embodiments are forbidden from even specifying a specific vector size in program code). Thus, the compiled code in these embodiments (i.e., binary code) runs on other embodiments with differing vector lengths, while potentially realizing performance gains from processors that support longer vectors. Consequently, as process technology allows longer vectors, execution of legacy binary code simply speeds up without any effort by software developers.

In some embodiments, vector lengths need not be powers of two. Specifically, vectors of 3, 7, or another number of data elements can be used in the same way as vectors with power-of-two numbers of data elements.

In the described embodiments, each data element in the vector can contain an address that is used by execution unit 302 for performing a set of memory accesses in parallel. In these embodiments, if one or more elements of the vector contain invalid memory addresses, invalid memory-read operations can occur. In these embodiments, invalid memory-read operations that would otherwise result in program termination instead cause any elements with valid addresses to be read and elements with invalid elements to be flagged, allowing program execution to continue in the face of speculative, and in hindsight illegal, read operations.

In some embodiments, processor 102 (and hence execution unit 302) is able to operate on and use vectors of pointers. In these embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

Although we describe processor 102 as including a particular set of units, in alternative embodiments, processor 102 can include different numbers or types of units. Moreover, although the embodiment shown in FIG. 2 is limited to a particular set of functional blocks, in the described embodiments, processor 102 can include other functional blocks, such as an instruction fetch unit, a decode unit, a dispatch unit, a branch execution unit, a memory management unit, I/O interfaces, etc. The additional functional blocks that can be present in processor 102 are known in the art and hence are not described in more detail.

Shared Fault-Status Register

Generally, while executing some vector instructions, Macroscalar processors can encounter a fault condition in one or more elements that do not effect the execution of other vector elements. For example, if a vector read operation is reading from memory using six addresses contained in the elements of the vector instruction, and the address in the fourth element causes processor 102 to read from an illegal or unmapped memory location, the fault in the fourth element must eventually be handled, but the reads from the first three elements can continue without causing errors. For this reason, Macroscalar processors include first-faulting and non-faulting vector instructions. These instructions enable a programmer or compiler to configure the processor to ignore faults that may be encountered in certain vector instruction elements while processing a first-faulting and non-faulting vector instruction. Specifically, first-faulting instructions cause these processors to ignore fault conditions encountered in elements other than the first (e.g., leftmost) element of the instruction, and non-faulting instruction cause these processors to ignore fault conditions encountered in all the elements of the instruction. Although fault conditions are ignored for the specified elements, a fault-status register (FSR) in the processor is updated to indicate which of these elements encountered a faulting condition. The processor can then determine how fault conditions, if any were encountered, are to be handled using the record in the FSR.

In Macroscalar processors, the first-faulting and non-faulting vector instructions may share a dependency on the fault-status register, i.e., these instructions may use the FSR as an input, as well as an output (in order to avoid reading elements that will not actually be used). For this reason, in prior Macroscalar processors, first-faulting and non-faulting instructions were required to execute serially so that updates to the fault-status register could be completed for a given first-faulting or non-faulting instruction before the processor commenced executing the next first-faulting or non-faulting instruction. Thus, in prior Macroscalar processors, first-faulting and non-faulting instructions could experience delays based on prior first-faulting and non-faulting instructions.

The described embodiments include mechanisms that enable the "sharing" of the fault-status register to avoid the delays that could be encountered in prior Macroscalar processors due to the dependency of first-faulting and non-faulting instructions on the fault-status register. These embodiments include an architectural FSR and a shadow copy of the architectural FSR. The shadow copy of the FSR may be shared among any first-faulting or non-faulting instructions that occur between occurrences of an Actual instruction. (Note that, although we describe the embodiments using an Actual instruction, in some embodiments, a different instruction can be used.)

In the shadow copy of the architectural FSR, the bit positions represent elements for which faults have been encountered (if any have been encountered) by one or more first-faulting or non-faulting instructions before an Actual instruction has executed to copy the values in the shadow copy of the architectural FSR to the architectural FSR. In the architectural FSR, the bit positions represent elements for which a fault condition was encountered (if any were encountered) before an Actual instruction was executed to copy the values in the shadow copy of the architectural FSR to the architectural FSR. In addition, the values in the architectural FSR have been committed to the architectural state of processor 102 and can therefore be freely used by any instruction that reads the FSR. By using the shadow copy of the architectural FSR in this way, these embodiments avoid the requirement to serially execute the first-faulting and non-faulting vector instructions that was present in prior Macroscalar processors.

Using the shadow copy of the architectural FSR as described above does not result in incorrect program execution because the first-faulting and non-faulting vector instructions that depend on the FSR do not cause an error when elements of the vector instruction happen to be executed improperly. Instead, when these instructions encounter a fault condition during execution, the FSR is updated and subsequent processing for the element (and perhaps subsequent elements) in the vector instruction is halted.

As described above, during operation, first-faulting and non-faulting vector instructions update the shadow copy of the architectural FSR to reflect elements for which a fault condition was encountered and masked/ignored. More specifically, in the described embodiments, multiple first-faulting or non-faulting vector instructions (a "first set of vector instructions") can be executing and updating the shadow copy of the architectural FSR simultaneously and without regard to program order. When an Actual instruction is subsequently encountered by processor 102, processor 102 stalls the Actual instruction. When all of the first-faulting and non-faulting vector instructions in the first set of vector instructions have passed the stage of execution where updates to the FSR can still be caused by the instruction, processor 102 releases the previously-stalled Actual instruction for execution, which copies the value from each bit position in the shadow copy of the architectural FSR to the architectural FSR and uses the architectural FSR to perform a subsequent operation. (Note that if all of the first-faulting and non-faulting vector instructions in the first set of vector instructions were already past this stage, processor 102 may not stall the Actual instruction.)

In some embodiments, after copying the values from the shadow copy of the architectural FSR to the architectural FSR, processor 102 executes a ClearFSR instruction, which creates a new shadow copy of the architectural FSR to which updates are made by first-faulting and non-faulting vector instructions that commence execution after the Actual instruction. In some embodiments, creating the new shadow copy of the architectural FSR includes configuring processor 102 so that at least one register in processor 102 is used as the new FSR. For example, if a first shadow copy of the architectural FSR is in register R5, the described embodiments can configure new first-faulting and non-faulting vector instructions to use the new shadow copy of the architectural FSR located in R7. In some embodiments, this includes setting a dependency of subsequent first-faulting and non-faulting vector instructions to indicate the register where the shadow copy of the architectural FSR is located.

Note that although we describe the embodiments using one register for clarity, in some embodiments, processor 102 can use two or more registers, memory locations, and/or variables to implement the FSR. In addition, these memory locations, registers, and/or variables may be in different places in processor 102 (i.e., the memory locations, registers, and/or variables need not all be located in vector registers 300 or vector execution unit 204, but may include memory locations, registers, and/or variables in other locations in processor 102).

In some embodiments, assuming that a set of first-faulting and/or non-faulting vector instructions are simultaneously executing in processor 102, updates to the shadow copy of the architectural FSR made by any of the first-faulting and/or non-faulting vector instructions are immediately visible/available to the other first-faulting and non-faulting vector instructions that are part of the set. Thus, in some embodiments, the other first-faulting and/or non-faulting vector instructions in the set can utilize the dynamically updated FSR in performing their own operations. This can mean that the other first-faulting and non-faulting vector instructions in the set can determine operations to be performed based on update(s) to the FSR. In some embodiments, any of the first-faulting and/or non-faulting vector instructions in the set can cancel operations that are in-progress or can not perform operations that would normally have been performed based on an update to the shadow copy of the architectural FSR.

In the described embodiments, when the architectural FSR or a shadow copy of the architectural FSR is initialized using the ClearFSR instruction, or when the new shadow copy of the architectural FSR is created, each of the elements is set to a predetermined value. For example, in some embodiments, the elements can be set to true. In these embodiments, when an update is subsequently made upon encountering a fault condition while executing a first-faulting or non-faulting vector instruction, the updated bit positions are set to a second predetermined value, e.g., false.

Process for Sharing the Fault Status Register

Figure 4:
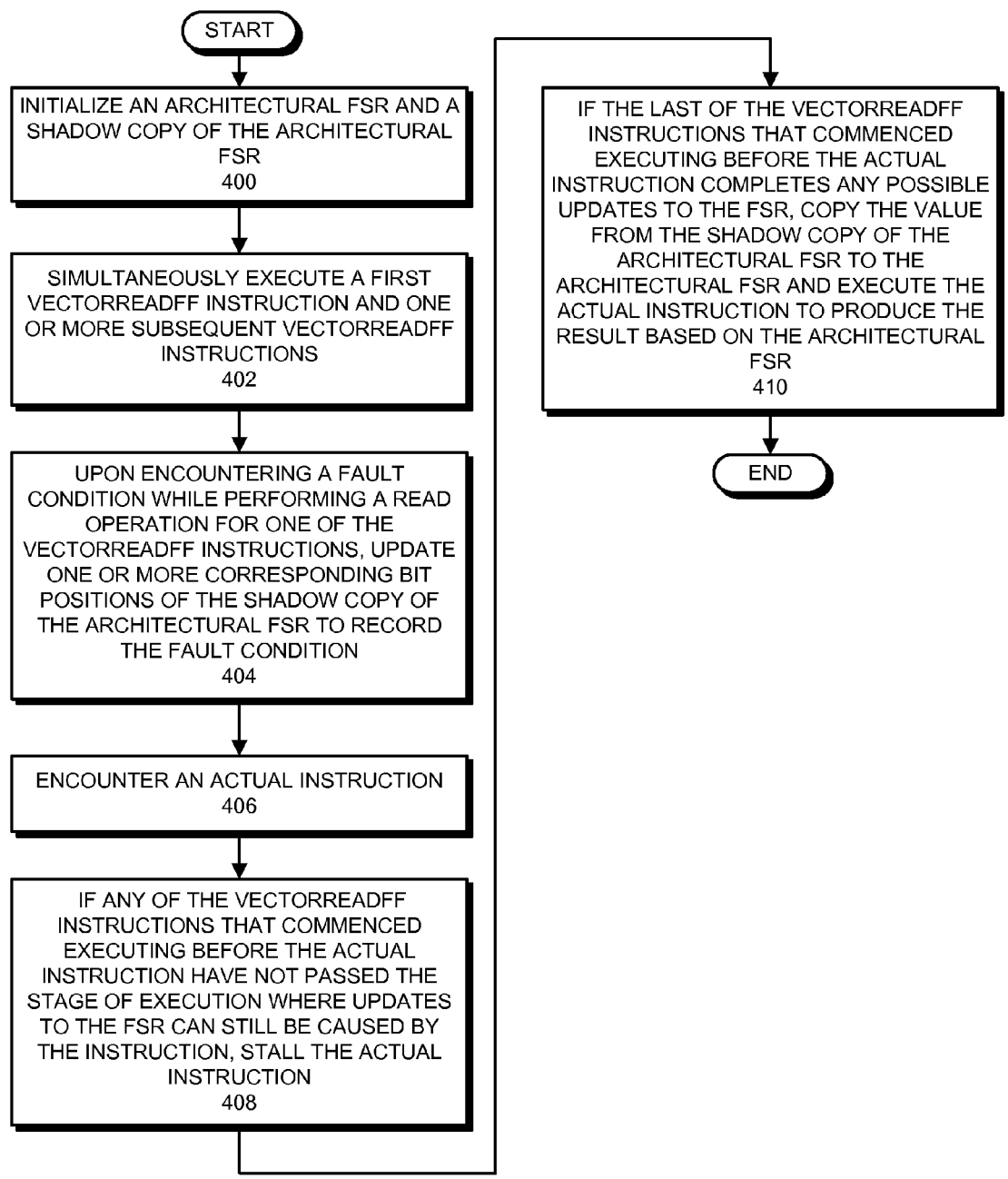
FIG. 4 presents a flowchart illustrating a process for sharing a fault-status register in accordance with the described embodiments.

FIG. 4 presents a flowchart illustrating a process for sharing a fault-status register in accordance with the described embodiments. For clarity and brevity, we describe the embodiments shown in FIG. 4 using VectorReadFF instructions as the vector instructions that are simultaneously executed and may encounter fault conditions. In addition, we assume an embodiment where the vector instruction that causes processor 102 copy the values from the shadow copy of the architectural FSR to the architectural FSR is the Actual instruction. However, alternative embodiments are operable using instructions other than the VectorReadFF instruction and/or the Actual instruction.

As shown in FIG. 4, the process starts when processor 102 initializes an architectural FSR and a shadow copy of the architectural FSR (step 400). When initializing the architectural FSR and the shadow copy of the architectural FSR, processor 102 sets each bit position in the architectural FSR and the shadow copy of the architectural FSR to a first predetermined value. For example, the bit positions in the architectural FSR and the shadow copy of the architectural FSR can be set to true, although alternative embodiments set the bit positions to different values. Note that initializing the FSRs can include executing a ClearFSR instruction or another instruction to perform the initialization.

Vector execution unit 204 then executes a first VectorReadFF instruction and, while executing the first VectorReadFF instruction, executes one or more subsequent VectorReadFF instructions (step 402). Note that at least two of the VectorReadFF instructions execute simultaneously, and hence processor 102 is performing read operations using a number of addresses that are contained in corresponding elements of the VectorReadFF instructions at the same time. Also, generally recall that one or more predicate vectors (e.g., a predicate vector for each of the VectorReadFF instructions) can be used in determining the elements of each of the VectorReadFF instructions upon which the read operation is performed.

Upon encountering a fault condition while performing a read operation for one of the VectorReadFF instructions, processor 102 updates one or more bit positions in the shadow copy of the architectural FSR to a second predetermined value (step 404). For example, processor 102 can update the one or more bit positions to false or to another value, depending on the first predetermined value. Although updating the bit positions in the shadow copy of the architectural FSR upon encountering fault conditions, processor 102 does not update bit positions in the architectural FSR itself. Thus, processor 102 records the elements where fault conditions have occurred for the VectorReadFF instructions, but, because processor 102 uses the shadow copy of the architectural FSR, the updates can occur in any order, regardless of the underlying order of the VectorReadFF instructions.

In these embodiments, executing the VectorReadFF instructions includes reading the shadow copy of the architectural FSR, and not the architectural FSR, to determine elements, if any, for which one of the VectorReadFF instructions encountered a fault condition. These embodiments can also read the shadow copy of the architectural FSR for a given VectorReadFF instruction while at least one of the VectorReadFF instructions are still being executed, and hence can still be performing updates to the shadow copy of the architectural FSR. Thus, in these embodiments, any of the VectorReadFF instructions can dynamically read updates to the shadow copy of the architectural FSR that were made by another of the VectorReadFF instructions. In some embodiments, this is true regardless of the original program order of the VectorReadFF instructions and/or the order in which the updates would normally have occurred, had the VectorReadFF instructions been required to execute serially in program order.

The described embodiments can also dynamically cancel an operation for one or more elements of the VectorReadFF instructions based on the state of one or more corresponding bit positions of the shadow copy of the architectural FSR following an update to the shadow FSR. More specifically, these embodiments can cancel an operation on the one or more elements based on an update to the shadow copy of the architectural FSR that would normally occur after the operation if the shadow copy of the architectural FSR were updated in program order. For example, assume two first-faulting vector instructions Ins1 and Ins2 that occur in order in program code. Further assume that both instructions have been dispatched to vector execution unit 204 and are being executed. If Ins2 encounters a fault condition in the third vector element, processor 102 sets the bit positions at and to the right of the third bit position of the FSR to zero. Processor 102 can then determine that the bit positions have been set to zero and can cancel one or more operations for elements at or to the right of the third element of Ins1. This is true regardless of the fact that Ins2 originally occurred after Ins1 in the program code.

In some embodiments operations that are in-flight (i.e., have already commenced) based on an update to the shadow copy of the architectural FSR can also be cancelled or have their results ignored. For example, assume that, during execution, a read request based on an address in the third element of Ins1 in the example above missed in L1 cache 104 and was sent to the L2 cache 106 (and perhaps from there to memory). Assume further that the read request is still outstanding (i.e., has not been filled). Upon determining that the third bit position of the shadow copy of the architectural FSR was set to zero following the encounter of a fault condition for the third element of Ins2, processor 102 can automatically return a zero (or another predetermined value) for the third element of Ins1 and can subsequently ignore any data returned for the read request. This is true regardless of the fact that Ins2 originally occurred after Ins1 in the program code.

Processor 102 then encounters an Actual instruction (step 406). Upon encountering the Actual instruction, if any of the pre-Actual-instruction VectorReadFF instructions have not passed the stage of execution where updates to the FSR can still be caused by the instruction, processor 102 stalls the Actual instruction (step 408) (Note that the Actual instruction is an example of an instruction that causes the synchronization of the architectural FSR with the shadow FSR). When the last of the VectorReadFF instructions subsequently completes any possible updates to the FSR, processor 102 copies the value from the shadow copy of the architectural FSR to the architectural FSR and executes the Actual instruction to produce the result based on the architectural FSR (step 410). Note that the copying operation can include copying from one or more shadow copies (or partial copies) of the architectural FSR that are located in different places in processor 102. For example, in some embodiments, shadow copies (or partial copies) of the architectural FSR can be located in one or more different execution units in processor 102 (e.g., in a load/store execution unit (not shown) and in floating-point execution unit 206).

In some embodiments, processor 102 also creates a second shadow copy of the architectural FSR. More specifically, processor 102 can execute a ClearFSR instruction, for which the operations comprise creating and initializing the second shadow copy of the architectural FSR. As before, processor 102 initializes each bit position in the second shadow copy of the architectural FSR to a first predetermined value. Then, while executing subsequent VectorReadFF instructions (i.e., VectorReadFF instructions that occur after the Actual instruction), if any fault conditions are encountered, processor 102 updates the second shadow copy of the architectural FSR. In some embodiments, the ClearFSR instruction causes processor 102 to ignore the vales in the prior shadow copy of the architectural FSR (e.g., invalidate them, overwrite them freely, etc.).

Predicting Page-Table Walks

Some of the described embodiments include a prediction mechanism that is configured to predict the result of page-walks of a page-table in memory. In these embodiments, while executing a VectorReadFF instruction, processor 102 performs lookups in a translation lookaside buffer (TLB) to determine a physical addresses for a virtual addresses from active elements of the VectorReadFF instruction. If the lookup misses in the TLB, processor 102 normally performs a page-walk in a page-table in memory to determine the address. However, if the address is invalid/unmapped (collectively, "illegal"), the page-walk returns a response that the address is illegal, which causes the read for that element to fail. Processor 102 then updates the FSR to indicate that the read failed for the corresponding element of the VectorReadFF instruction.

In some embodiments, upon encountering a miss in the TLB, the prediction mechanism determines if the response to the page-walk of the page-table in memory is likely to indicate that the address is illegal (i.e., if the response from the page-walk of the page-table in memory is predictable). If so, the prediction mechanism can predict that the response from the page-walk of the page-table in memory will indicate that the address is illegal. Upon receiving the prediction, processor 102 can immediately set the corresponding bit position in the FSR to indicate that the read operation for the element of the VectorReadFF instruction failed and can cancel (or not send) the request for the page-walk of the page-table in memory for the element. Although this prediction causes the page-walk of the page-table in memory to be cancelled/never sent, the eventual outcome of the instruction will be determined, as the operation for the corresponding element of the VectorReadFF instruction will be executed again on another pass through the loop.

On the other hand, if the page-walk of the page-table in memory is not likely to indicate that the address is illegal, the prediction mechanism does not predict the result of the page-walk of the page-table in memory, and processor 102 continues with a normal the page-walk of the page-table in memory for the corresponding element of the VectorReadFF instruction.

The determination whether a result for the page-walk of the page-table in memory is predictable that is made by the prediction mechanism can be based on one or more factors. Generally, any factor that can be used to characterize the response to the page-walk of the page-table in memory for the VectorReadFF instruction (e.g., the type, address, inputs, outputs, etc. of the VectorReadFF instruction), the history of instruction execution (i.e., the VectorReadFF instruction itself and/or other instructions), the past or current state of processor 102, the page-table, other page-table page-walks, etc. can be used in making the determination. As examples, the prediction mechanism can make the prediction based on one or more of the following factors: (1) a record in processor 102 indicates that the VectorReadFF instruction received an illegal address response to a page-walk of the page-table in memory when executed one or more previous times; (2) a table lookup computed from an address of the VectorReadFF instruction returns a confirmation that the VectorReadFF instruction is likely to receive an illegal address response to the page-walk of the page-table in memory; (3) one or more processor tracking mechanisms are set to indicate that the VectorReadFF instruction is likely to receive an illegal address response to the page-walk of the page-table in memory; (4) a computation made by a prediction computation mechanism (e.g., a fuzzy logic, processor, neural network, etc.) in the prediction mechanism indicates that the VectorReadFF instruction is likely to receive an illegal address response to the page-walk of the page-table in memory; (5) the addresses of one or more prior instructions of a given type that preceded the VectorReadFF instruction indicate that the VectorReadFF instruction is likely to receive an illegal address response to the page-walk of the page-table in memory; (6) one or more factors related to executing instructions prior to the VectorReadFF instruction (a code-path history) indicate that the VectorReadFF instruction is likely to receive an illegal address response to the page-walk of the page-table in memory; (7) a pattern of taken or not-taken branches for a number of branches that preceded the VectorReadFF instruction that is being predicted indicates that the VectorReadFF instruction is likely to receive an illegal address response to the page-walk of the page-table in memory; (8) a value of counter indicating the number of occurrences of an event (e.g., a prior prediction) indicates that the VectorReadFF instruction is likely to receive an illegal address response to the page-walk of the page-table in memory; or (9) a value of a variable representing a confidence level of predicting the VectorReadFF instruction indicates that the VectorReadFF instruction is likely to receive an illegal address response to the page-walk of the page-table in memory. In these embodiments, prediction mechanism can store a value that represents each factor to be used in making a decision and then can perform one or more mathematical, logical, combinatory, comparison, or algorithmic operations using the values to make the determination.

In addition, when making the determination whether to predict that the VectorReadFF instruction is likely to receive an illegal address response to the page-walk of the page-table in memory, prediction mechanism can determine that all VectorReadFF instructions are likely to receive an illegal address response to the page-walk of the page-table in memory. That is, predict that all VectorReadFF instructions are likely to receive an illegal address response to the page-walk of the page-table in memory. In some embodiments, the prediction can be made without considering any of the above-described factors, i.e., can be automatic. In some embodiments, this is the initial prediction that is made for each VectorReadFF instruction, until a history of executing the VectorReadFF instruction can be determined.

In the described embodiments, prediction mechanism can include one or more variables, memory locations, registers, lookup tables, status flags/indicators, functional blocks, or other mechanisms or circuit structures that are used to hold values representing the factors to enable prediction mechanism to determine if the VectorReadFF instruction is likely to receive an illegal address response to the page-walk of the page-table in memory. Prediction mechanism can use these mechanisms to maintain records of the one or more factors that are used in making the determination. Prediction mechanism and/or processor 102 can additionally compute values to be used by prediction mechanism for making the determination. These values can be computed at the time that the determination is to be made or can be automatically computed whenever a relevant event occurs and stored in one or more of the mechanisms in prediction mechanism.

Note that although we describe these embodiments using the VectorReadFF instruction, these embodiments work with other types of instructions, such as the VectorReadNF instruction, etc.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for executing vector instructions in a processor, comprising:
   initializing an architectural fault-status register (FSR) and a shadow copy of the architectural FSR by setting each of N bit positions in the architectural FSR and the shadow copy of the architectural FSR to a first predetermined value;
   executing a first vector instruction, wherein the first vector instruction is a first-faulting or non-faulting vector instruction; and
   while executing the first vector instruction, executing one or more subsequent vector instructions, wherein each of the subsequent vector instructions is a first-faulting or non-faulting vector instruction;
   wherein executing the first vector instruction and the subsequent vector instructions comprises updating one or more bit positions in the shadow copy of the architectural FSR to a second predetermined value upon encountering a fault condition while performing a corresponding operation for the first vector instruction or one of the subsequent vector instructions; and
   wherein the method further comprises not updating bit positions in the architectural FSR upon encountering a fault condition while performing a corresponding operation for the first vector instruction or one of the subsequent vector instructions.

2. The method of claim 1, wherein executing the first vector instruction and the subsequent vector instructions comprises:
   reading the shadow copy of the architectural FSR, and not the architectural FSR, to determine elements, if any, for which the first vector instruction or one of the subsequent vector instructions encountered a fault condition.

3. The method of claim 2, wherein reading the shadow copy of the architectural FSR comprises reading the shadow copy of the architectural FSR while at least one of the first vector instruction or one of the subsequent vector instructions are still being executed and hence may still update the shadow copy of the architectural FSR.

4. The method of claim 3, wherein the method further comprises:
   canceling an operation on one or more elements for at least one of the first vector instruction or any of the subsequent vector instructions based on the state of one or more corresponding bit positions of the shadow copy of the architectural FSR upon an update to the shadow copy of the architectural FSR.

5. The method of claim 4, wherein canceling the operation comprises:
   canceling or not executing an operation on the one or more elements based on an update to the shadow copy of the architectural FSR that would normally occur after the operation if the shadow copy of the architectural FSR were updated in program order.

6. The method of claim 1, wherein the method further comprises:
   encountering a predetermined vector instruction that synchronizes the architectural FSR with the shadow FSR;
   stalling execution of the vector instruction that synchronizes the architectural FSR with the shadow FSR until the first vector instruction and the subsequent vector instructions have completed all possible updates to the shadow copy of the architectural FSR;
   when the first vector instruction and the subsequent vector instructions have completed all possible updates to the shadow copy of the architectural FSR, copying the value from the shadow copy of the architectural FSR to the architectural FSR; and executing the predetermined vector instruction to synchronize the architectural FSR with the shadow FSR.

7. The method of claim 6, wherein the method further comprises:

creating a second shadow copy of the architectural FSR and initializing each of N bit positions in the second shadow copy of the architectural FSR to a first predetermined value; and while subsequently executing further first-faulting or non-faulting vector instructions that update one or more bit positions of the shadow copy of the architectural FSR to a second predetermined value upon encountering a fault condition while performing a corresponding operation, updating the second shadow copy of the architectural FSR.

8. The method of claim 6, wherein the predetermined vector instruction is an Actual instruction.

9. The method of claim 1, wherein updating one or more corresponding elements of the shadow copy of the architectural FSR to a second predetermined value comprises:

updating the elements of the shadow copy of the architectural FSR each time one of the first vector instruction or the subsequent vector instructions encounters a fault condition, regardless of the program order of the vector instruction that updates the shadow copy of the architectural FSR.

10. A processor for executing vector instructions, comprising:

an execution unit in the processor, wherein the execution unit is configured to:

initialize an architectural fault-status register (FSR) and a shadow copy of the architectural FSR by setting each of N bit positions in the architectural FSR and the shadow copy of the architectural FSR to a first predetermined value;

execute a first vector instruction, wherein the first vector instruction is a first-faulting or non-faulting vector instruction; and while executing the first vector instruction, execute one or more subsequent vector instructions, wherein each of the subsequent vector instructions is a first-faulting or non-faulting vector instruction;

wherein when executing the first vector instruction and the subsequent vector instructions, the execution unit is configured to update one or more bit positions in the shadow copy of the architectural FSR to a second predetermined value upon encountering a fault condition while performing a corresponding operation for the first vector instruction or one of the subsequent vector instructions; and wherein the execution unit is configured not to update bit positions in the architectural FSR upon encountering a fault condition while performing a corresponding operation for the first vector instruction or one of the subsequent vector instructions.

11. The processor of claim 10, wherein when executing the first vector instruction and the subsequent vector instructions, the execution unit is configured to read the shadow copy of the architectural FSR, and not the architectural FSR, to determine elements, if any, for which the first vector instruction or one of the subsequent vector instructions encountered a fault condition.

12. The processor of claim 11, wherein when reading the shadow copy of the architectural FSR, the execution unit is configured to read the shadow copy of the architectural FSR while at least one of the first vector instruction or one of the subsequent vector instructions are still being executed and hence may still update the shadow copy of the architectural FSR.

13. The processor of claim 12, wherein, upon an update to the shadow copy of the architectural FSR, the execution unit is configured to cancel an operation on one or more elements for at least one of the first vector instruction or any of the subsequent vector instructions based on the state of one or more corresponding bit positions of the shadow copy of the architectural FSR.

14. The processor of claim 13, wherein when canceling the operation, the execution unit is configured to cancel or not execute an operation on the one or more elements based on an update to the shadow copy of the architectural FSR that would normally occur after the operation if the shadow copy of the architectural FSR were updated in program order.

15. The processor of claim 10, wherein upon encountering a predetermined vector instruction that synchronizes the architectural FSR with the shadow FSR, the execution unit is configured to stall the execution of the vector instruction that synchronizes the architectural FSR with the shadow FSR until the first vector instruction and the subsequent vector instructions have completed all possible updates to the shadow copy of the architectural FSR; and upon the first vector instruction and the subsequent vector instructions completing all possible updates to the shadow copy of the architectural FSR, the execution unit is configured to copy the value from the shadow copy of the architectural FSR to the architectural FSR and execute the predetermined vector instruction to synchronize the architectural FSR with the shadow FSR.

16. The processor of claim 15, wherein the execution unit is configured to:

create a second shadow copy of the architectural FSR and initialize each of N bit positions in the second shadow copy of the architectural FSR to a first predetermined value; and update the second shadow copy of the architectural FSR while subsequently executing further first-faulting or non-faulting vector instructions that update one or more bit positions of the shadow copy of the architectural FSR to a second predetermined value upon encountering a fault condition while performing a corresponding operation.

17. The processor of claim 15, wherein the predetermined vector instruction is an Actual instruction.

18. The processor of claim 10, when updating one or more corresponding elements of the shadow copy of the architectural FSR to a second predetermined value, the execution mechanism is configured to update the elements of the shadow copy of the architectural FSR each time one of the first vector instruction or the subsequent vector instructions encounters a fault condition, regardless of the program order of the vector instruction that updates the shadow copy of the architectural FSR.

19. A computer system for executing vector instructions, comprising:

a processor;

a memory coupled to the processor, wherein the memory stores data and instructions for the processor; and an execution unit in the processor, wherein the execution unit is configured to:

initialize an architectural fault-status register (FSR) and a shadow copy of the architectural FSR by setting each of N bit positions in the architectural FSR and the shadow copy of the architectural FSR to a first predetermined value;

execute a first vector instruction, wherein the first vector instruction is a first-faulting or non-faulting vector instruction; and while executing the first vector instruction, execute one or more subsequent vector instructions, wherein each of the subsequent vector instructions is a first-faulting or non-faulting vector instruction;

wherein when executing the first vector instruction and the subsequent vector instructions, the execution unit is configured to update one or more bit positions in the shadow copy of the architectural FSR to a second predetermined value upon encountering a fault condition while performing a corresponding operation for the first vector instruction or one of the subsequent vector instructions; and wherein the execution unit is configured not to update bit positions in the architectural FSR upon encountering a fault condition while performing a corresponding operation for the first vector instruction or one of the subsequent vector instructions.

20. The computer system of claim 19, wherein when executing the first vector instruction and the subsequent vector instructions, the execution unit is configured to read the shadow copy of the architectural FSR, and not the architectural FSR, to determine elements, if any, for which the first vector instruction or one of the subsequent vector instructions encountered a fault condition.

21. The computer system of claim 20, wherein when reading the shadow copy of the architectural FSR, the execution unit is configured to read the shadow copy of the architectural FSR while at least one of the first vector instruction or one of the subsequent vector instructions are still being executed and hence may still update the shadow copy of the architectural FSR.

22. The computer system of claim 21, wherein, upon an update to the shadow copy of the architectural FSR, the execution unit is configured to cancel an operation on one or more elements for at least one of the first vector instruction or any of the subsequent vector instructions based on the state of one or more corresponding bit positions of the shadow copy of the architectural FSR.

23. The computer system of claim 22, wherein when canceling the operation, the execution unit is configured to cancel or not execute an operation on the one or more elements based on an update to the shadow copy of the architectural FSR that would normally occur after the operation if the shadow copy of the architectural FSR were updated in program order.

24. The computer system of claim 19, wherein upon encountering a predetermined vector instruction that synchronizes the architectural FSR with the shadow FSR, the execution unit is configured to stall the execution of the vector instruction that synchronizes the architectural FSR with the shadow FSR until the first vector instruction and the subsequent vector instructions have completed all possible updates to the shadow copy of the architectural FSR; and upon the first vector instruction and the subsequent vector instructions completing all possible updates to the shadow copy of the architectural FSR, the execution unit is configured to copy the value from the shadow copy of the architectural FSR to the architectural FSR and execute the predetermined vector instruction to synchronize the architectural FSR with the shadow FSR.

* * * * *